United States Patent Office 2,997,849
Patented Aug. 29, 1961

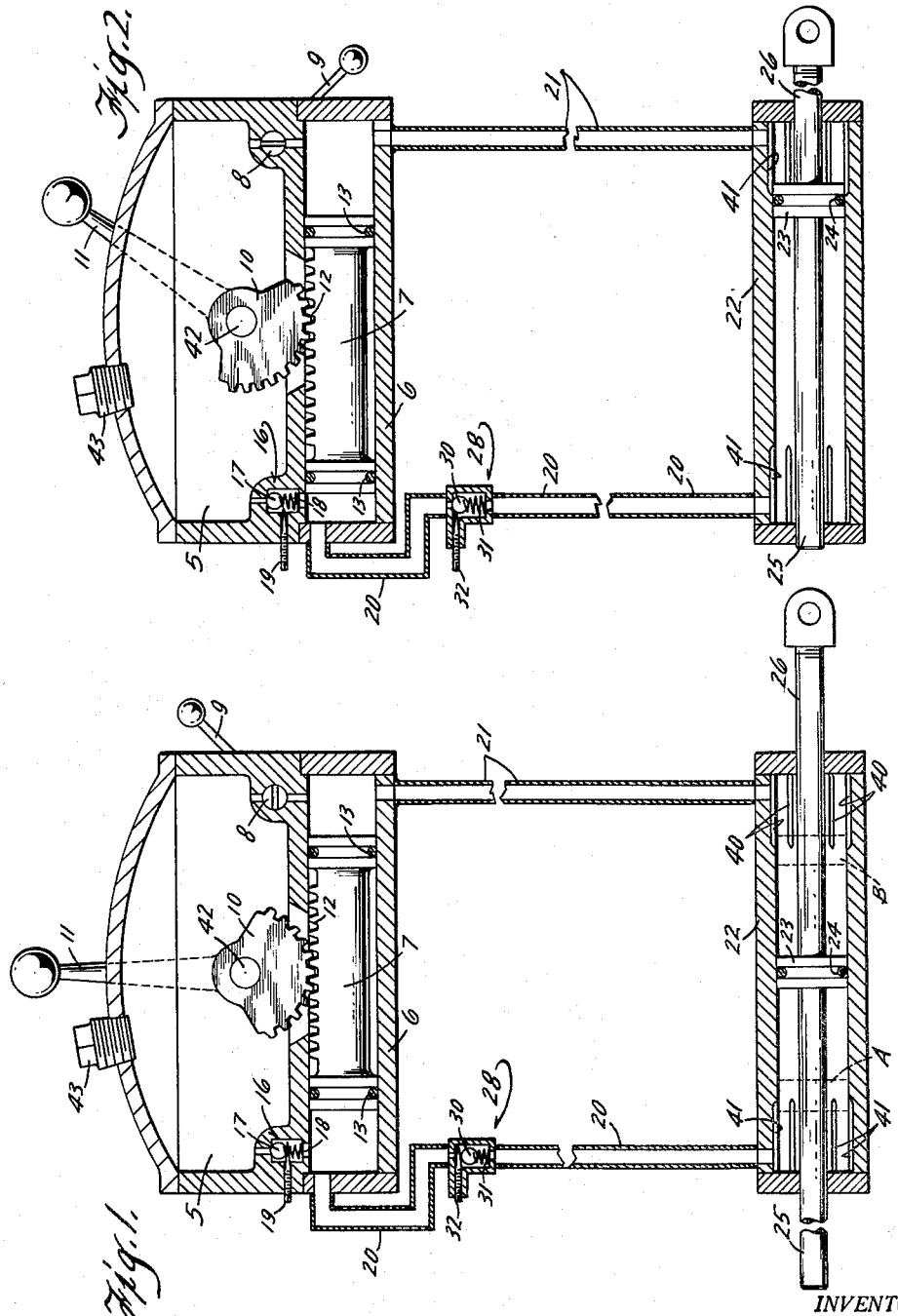

2,997,849
SELF-PURGING HYDRAULIC CONTROL DEVICE
William J. Shimanckas, Waukegan, Ill., assignor to Outboard Marine Corporation, Waukegan, Ill., a corporation of Delaware
Filed May 28, 1959, Ser. No. 816,416
3 Claims. (Cl. 60—54.5)

This invention relates to improvements in means for purging gases from hydraulic systems for remote operation of a movable member and for accurately re-positioning the movable member with respect to the control.

Liquid systems for control and operation of movable members at a remote point are satisfactory only so long as the liquid is free from gas bubbles or there are no gas accumulations in the system, as the liquid is substantially incompressible and therefore accurately transmits changes of position whereas gases are compressible and will not transmit position changes accurately. When a system including cylinders and tubing is first filled with liquid, there are residues of gas trapped at various points in the system and such residues are gradually dissolved in or are mixed with the liquid and are carried to and released at high points in the system. Also, even when the liquid itself is initially free from gases, operation of the system produces partial vacuum at some points so that there may be leakage of air into the system. In some liquids, vaporizable components are released under some conditions and act as gases which affect the rate and accuracy of transmission of liquid pressure. Hence, it is desirable to provide simple and effective means for purging such systems, particularly when the piston of a slave cylinder is to follow accurately and quickly the movement of a piston in a master cylinder. It is also desirable to insure that the master and slave pistons are accurately positioned with respect to each other after completion of the purging operation.

In the drawings:

FIG. 1 is a cross-sectional view of structure embodying the present invention, in which the parts are in position for operation of the system for remote control of a movable device; and FIG. 2 is a view similar to FIG. 1 in which the parts of the system are in position for purging of gases therefrom.

Referring to the drawings, a reservoir 5 is so combined with a master cylinder 6 that liquid may flow from the reservoir to the cylinder and vice verse depending on the manipulation of a piston 7 in the cylinder and the opening and closing of a first valve 8 by handle 9 and a second valve to be described. A gear segment 10 is mounted on shaft 42 extending through the side of the reservoir, with a handle 11 outside the reservoir for rocking the gear. The teeth of the gear are in mesh with rack 12 on piston 7 to reciprocate the piston in cylinder 6. The ends of piston 7 are grooved for receiving means such as O-rings 13 for sealing the ends of the piston in the cylinder. The first valve 8 is shown as being of the plug type and is adjacent one end of the cylinder 6 to control communication thereof with the reservoir 5. A passage adjacent to the other end of cylinder 6 and connecting with reservoir 5, receives a second valve 16 in the form of a ball 17 which is urged by a spring 18 to the closed position, so that fluid may pass from the reservoir to cylinder 6, but not from the cylinder to the reservoir. A screw 19 can be adjusted to hold the ball 17 seated, so that fluid cannot pass in either direction.

Conduits 20, 21 connect the respective ends of the master cylinder 6 with the ends of a slave cylinder 22 in which a piston 23 is reciprocable. The ends of piston 23 is also grooved to receive sealing means such as O-rings 24, and operating rods 25 and 26 extend from the piston ends through suitable conventional packings (not shown) in the ends of cylinder 22. Master cylinder 6 and slave cylinder 22 are so proportioned that slave piston 23 moves between positions A and B, responsive to movement of master piston 7, and therefore partially over grooves 40, 41 in the inside wall of slave cylinder 22, which grooves extend to points where the conduits 20 and 21 connect with the cylinder but not far enough to cause leakage past seal 24 in normal operation.

Conduit 20 is provided with a third ball check valve 28 in which ball 30 is urged toward seated position by a spring 31 but is normally held in unseated or open position by a screw 32.

Upon filling the system with liquid, the liquid is poured into receiver 5 through the filling cap 43. First valve 8 is opened and the third valve 28 is allowed to close by withdrawing screw 32 sufficiently to clear ball 30. The second ball check valve 16 is allowed to operate as a check valve by withdrawing screw 19 sufficiently to clear ball 17. Reciprocation of piston 7 then pumps the liquid through check valve 16, cylinder 6, conduit 20, and check valve 28 into slave cylinder 22. Piston 23 is driven to the right in cylinder 22 until it reaches grooves 40, which allow liquids and gases to by-pass the piston into conduit 21. The liquid displaces gases in both the cylinder and the conduits and drives them to discharge through first valve 8 to the reservoir, from which they are vented. As the master piston 7 is reciprocated, the liquid is pumped through the system and flushes all of the gas out of the cylinder and the conduits so that both cylinders may be entirely filled with liquid. Cylinders 6 and 22 are positioned with their outlets at the top, as shown, but conduits 20 and 21 may extend in any direction, since gases will be driven through them in the form of bubbles.

During normal operation, the first valve 8 is closed and the screw 32 is turned inwardly to hold the third valve ball 30 off its seat as shown in FIG. 1. Second valve ball 17 is held in its seat by screwing in screw 19. Movement of the master piston 7 toward the left then forces the liquid in the left end of master cylinder 6 through conduit 20 and past open valve 28 into slave cylinder 22 and moves piston 23 toward the right, while liquid in the right end of slave cylinder 22 moves toward the right end of master cylinder 6. Movement of master piston 7 toward the right forces liquid through conduit 21 into the right end of slave cylinder 22 so that piston 23 moves toward the left. Liquid in the left end of slave cylinder 22 is now forced through conduit 20 and past the open ball 30 of fluid valve 28 into the left end of master cylinder 6.

If gases or vapors accumulate in the system, the slave piston 23 will no longer accurately reflect the position of master piston 7 and such gases or vapors must be purged from the system. The first valve 8 is now opened and the screw 19 of the second valve is turned to release ball 17 to function as a check valve. Ball 30 of the third valve 28 is released to function as a check valve by turning out screw 32, as shown in FIG. 2. Reciprocal movement of the master piston 7 now again causes movement of the liquid through the master and slave cylinders, the gases and vapors venting through valve 8 and additional liquid entering the system from reservoir 5 through ball check valve 16 to replace the vented gases and vapors.

If the positions of the master and slave cylinders fail to correspond due to leakage of liquid past a piston, without entry of gas into the system, the pistons may be precisely positioned by running master piston 7 to either end of cylinder 6, which drives slave piston 23 to the opposite end of slave cylinder 22. When piston 23 passes position A or B, fluid bypasses it through grooves 41 or 40, respectively, until master piston 7 reaches the end of its stroke. Rods 25, 26 are then manually returned to position A or B, in which grooves 40 and 41 do not afford a passage past piston 23, at which time the pistons are in precisely corresponding positions, as master piston 7 will begin to move as soon as the grooves 40 or 41 are fully covered.

I claim:

1. A hydraulic system for remote operation of a device to be controlled and comprising a reservoir for a liquid, a master cylinder and piston associated with the reservoir, first and second valves for severally connecting the ends of the master cylinder with the reservoir, a slave cylinder and piston, conduits severally connecting the ends of the master cylinder with the ends of the slave cylinder, and a third valve in one of the conduits, said first and second valves being normally closed and the third valve normally open, the first and third valves being check valves having manually operable means for holding them respectively closed and open, the slave cylinder having grooves in the inside cylindrical surface thereof adjacent the conduit openings into the cylinder and beyond the normal range of slave piston reciprocation, the slave piston therein being adapted to extend over portions of the grooves in one position whereby gases in the liquid may escape from the slave cylinder into the conduits by the way of the grooves.

2. In combination, a hydraulic slave cylinder having a slave piston reciprocable through a predetermined normal range therein, said cylinder being provided with a port for a working fluid, said cylinder being further provided beyond said range with a bypass groove extending toward said port on the inside surface of said cylinder and adapted to permit leakage of the working fluid past said piston when the piston exceeds said range whereby the stroke of the piston in response to movement of said working fluid into said cylinder is limited by leakage of working fluid into the groove at the end of the effective stroke of the piston in said range, a second port in said slave cylinder positioned to communicate with said groove in all positions of the piston, a master cylinder having conduits connecting its ends with said first and second ports of said slave cylinder, a piston reciprocable in the master cylinder, a reservoir having duct means providing communication between the reservoir and the respective ends of the master cylinder, and means for using the piston in the master cylinder as a pump for the circulation of liquid from said reservoir through said cylinders to purge gases therefrom, said means including normally closed manually controlled valves in said duct means to preclude communication between the reservoir and the master cylinder during normal operation while permitting the master cylinder to communicate with the reservoir during purging of gases, and a check valve in a conduit connecting the master cylinder and the slave cylinder, said check valve having manually releasable means for rendering it ineffective to provide unobstructed communication between the said ends of said cylinders during normal operation, said check valve functioning to control the direction of flow of working fluid when the piston of the master cylinder is functioning as a purging pump.

3. The combination set forth in claim 2 in which one of the normally closed valves comprises a check valve and has releasable means for holding it to its seat for the aforesaid manual control thereof, said valve being disposed in said duct means leading from the reservoir to that end of the master cylinder from which opens the conduit wherein the first mentioned check valve is disposed, the two check valves opening in the same direction of flow when functioning as check valves during operation of the piston of the master cylinder as a purging pump.

References Cited in the file of this patent

UNITED STATES PATENTS

| | | |
|---|---|---|
| 2,345,811 | Harp | Apr. 4, 1944 |
| 2,359,949 | Van der Werff | Oct. 10, 1944 |
| 2,882,886 | Griffith | Apr. 21, 1959 |

FOREIGN PATENTS

| | | |
|---|---|---|
| 371,659 | Great Britain | Apr. 28, 1932 |